United States Patent [19]

Keller

[11] 4,274,431
[45] Jun. 23, 1981

[54] FUEL VENT WITH GRAVITY VALVE

[76] Inventor: Russell D. Keller, 1750 SE. Risley, Milwaukie, Oreg. 97222

[21] Appl. No.: 2,242

[22] Filed: Jan. 10, 1979

[51] Int. Cl.³ ............................................. F16K 17/36
[52] U.S. Cl. ........................................ 137/43; 137/45
[58] Field of Search ................... 137/38, 39, 43, 45

[56] References Cited

U.S. PATENT DOCUMENTS

| | | | |
|---|---|---|---|
| 224,736 | 2/1880 | Shea | 137/45 |
| 704,529 | 7/1902 | Foskett | 137/38 |
| 1,486,985 | 3/1924 | Monahan | 137/43 X |
| 1,683,338 | 9/1928 | Evinrude | 137/43 |
| 1,717,573 | 6/1929 | McAtee | 137/43 X |
| 1,992,151 | 2/1935 | Woodbridge | 137/43 X |
| 2,355,288 | 8/1944 | Fritzinger | 137/43 X |
| 2,813,142 | 11/1957 | Lindberg | 137/43 X |
| 3,757,987 | 9/1973 | Marshall | 137/43 X |
| 3,918,606 | 11/1975 | Keller | 137/43 X |

FOREIGN PATENT DOCUMENTS 1155064  9/1963  Fed. Rep. of Germany ............. 137/43

*Primary Examiner*—Robert G. Nilson
*Attorney, Agent, or Firm*—Klarquist, Sparkman, Campbell, Leigh, Whinston & Dellett

[57] ABSTRACT

A fuel tank vent apparatus is described with an improved gravity actuated valve for preventing liquid fuel spillage. A weight pivotally supported above the valve acts as a plumb weight for operating a movable valve member connected thereto to close the valve when the vent apparatus is tipped. In the one embodiment the plumb weight is hung on a chain that is also connected to the valve member. The fuel vent apparatus is especially useful on the fuel tank of an automobile or truck in that it enables gaseous fuel vapor to be vented from the tank through a passageway, thereby preventing pressure buildup within the tank while also employing in such passageway the gravity operated valve which is closed when the truck turns over or tips at an angle greater than a predetermined angle to prevent the leakage of liquid fuel through such vent. In one embodiment, the fuel vent apparatus also includes a gas pressure check valve for preventing the internal pressure within the tank from falling below the outside atmospheric pressure, which tends to hold the gravity valve closed and would otherwise prevent proper venting. In another embodiment the chain supporting the weight and connecting such weight to the valve member is replaced by link rods attached by ball and socket connections.

11 Claims, 9 Drawing Figures

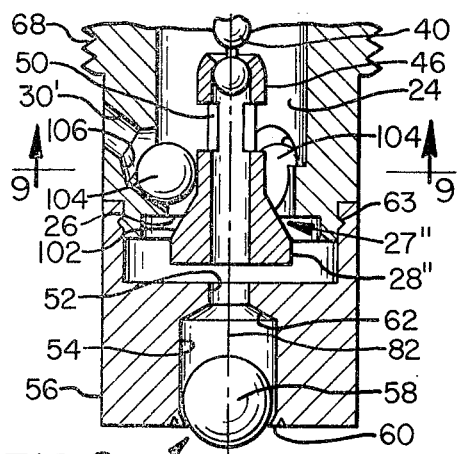
FIG. 8
FIG. 9
FIG. 6
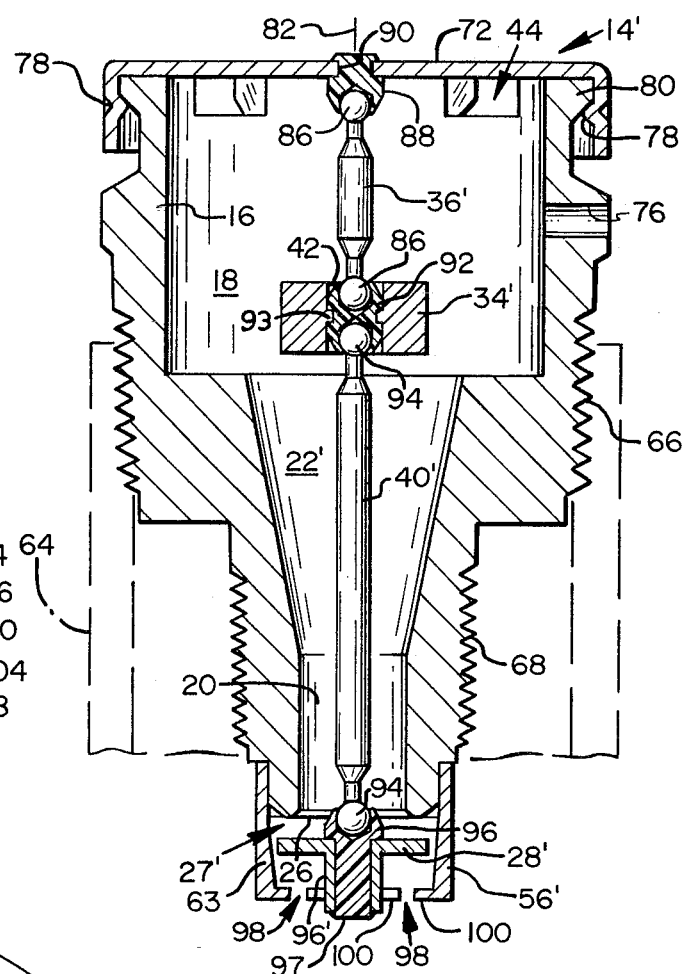
FIG. 5
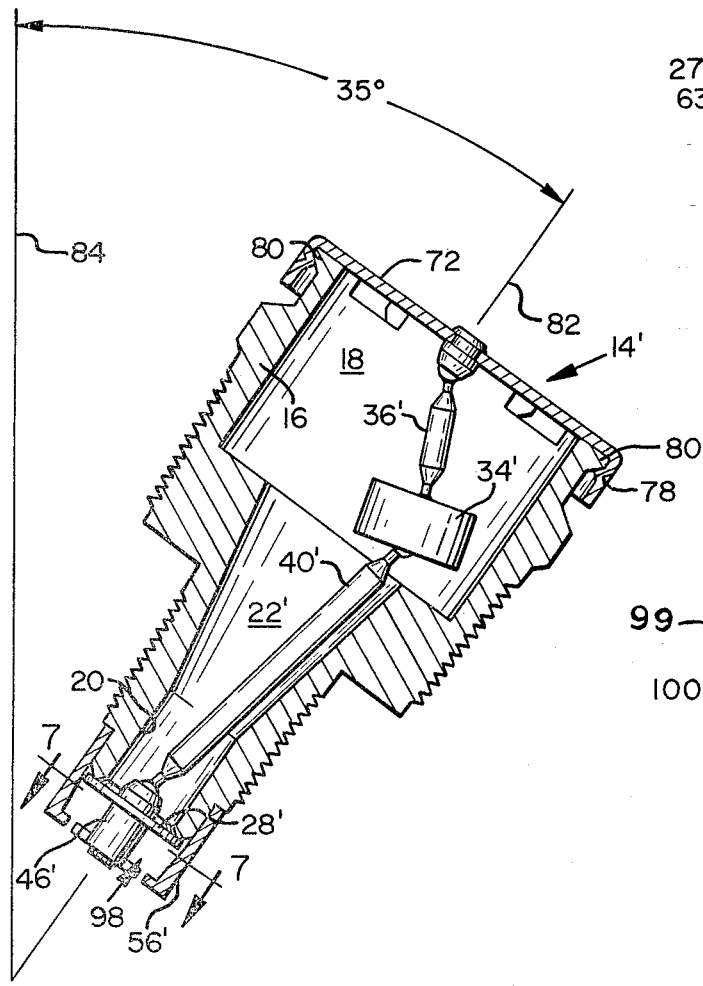
FIG. 7

FUEL VENT WITH GRAVITY VALVE

BACKGROUND OF INVENTION

The subject matter of the present invention relates generally to fuel vent apparatus for venting gaseous fuel vapors from a fuel tank, and in particular to such a vent apparatus which also includes an improved gravity operated valve to prevent liquid fuel spillage from the tank. The fuel vent apparatus of the present invention is especially useful on the fuel tanks of trucks and other vehicles operated by liquid fuel such as gasoline, diesel fuel and the like. However, it is also useful on fuel tanks for outboard motor boats, lawn mowers, chain saws and gasoline cans to prevent fuel spillage and fires when such fuel tanks are accidentally overturned.

Previously, it has been proposed to provide a fuel tank with a fuel filler cap having a gravity operated valve which closes a vent passage in such cap when the tank overturns, as on an outboard motor for a boat discussed in U.S. Pat. No. 1,683,338 of Evinrude, granted Sept. 4, 1928. In addition, it is also known to provide such a filler cap with pressure relief valves to prevent excessive positive pressure in addition to such gravity operated valves on the fuel tank of a motor vehicle, as shown in U.S. Pat. No. 3,757,987 of Marshall, granted Sept. 11, 1973, and U.S. Pat. No. 3,918,606 of Keller, granted Nov. 11, 1975. However, the gravity operated valves employed in such patents all employ a valve control means having a spherical weight which is positioned below the movable valve member and rolls up a guide to urge such valve member into a closed position when the tank overturns. This has the disadvantage that tipping of the gas tank through a much greater angle is required before the gravity operated valves of such prior art apparatus close completely. As a result, these valves are slow acting and do not eliminate spillage under certain conditions.

In the fuel vent apparatus of the present invention, the gravity operated valve is controlled by a plumb weight supported above the movable valve member. This plumb weight control means is much more sensitive in that it closes such valve with very little movement of the tank through an angle of about 30°. Thus, in one embodiment when the axis of the vent body moves from its normal vertical position through an angle greater than 28° in any direction, the gravity operated valve closes to prevent fuel spillage from the tank.

In addition, the present fuel vent apparatus also includes a gas pressure check valve in a second path in parallel with the path through the gravity operated valve. This check valve prevents a vacuum from being created within the fuel tank when the fuel therein is used up, which would otherwise tend to hold the gravity operated valve closed. The check valve opens when a negative pressure is created in the fuel tank and immediately closes as soon as the pressure within the tank is equalized to atmospheric pressure and thereafter becomes slightly positive, preventing spillage when the tank has been tipped on its side. Excess positive pressure within the tank in its tipped position is relieved by the conventional pressure relief valves used on filler caps.

SUMMARY OF THE INVENTION

It is therefore one object of the present invention to provide an improved fuel tank vent apparatus having a gravity operated valve of greater sensitivity which is automatically closed when the fuel tank tips at greater than a predetermined angle to prevent leakage of liquid fuel through the vent passageway.

Another object of the present invention is to provide such a fuel tank vent apparatus of simple, trouble-free operation and of economical construction.

A further object of the invention is to provide such a fuel tank vent apparatus in which the gravity actuated valve is operated by a control weight pivotally supported above the valve and connected to a movable valve member.

An additional object of the invention is to provide such a fuel tank vent apparatus in which the control weight is hung as a plumb weight above the valve member and connected to such valve member for closing the valve in response to tipping movement of the fuel tank and vent apparatus.

Still another object of the invention is to provide such an improved fuel tank vent apparatus which also includes a pressure check valve for preventing a negative pressure from being created within the fuel tank and tending to hold the gravity operated valve closed.

A still further object of the invention is to provide such a fuel tank vent apparatus in which the pressure check valve is in a second fluid path which is in parallel with the fluid path closed by the gravity valve between the fuel tank chamber and the vent passageway.

DRAWINGS

Other objects and advantages of the present invention will be apparent from the following detailed description of certain preferred embodiments thereof and from the attached drawings, of which:

FIG. 5 is an enlarged vertical section view of a second embodiment of the vent apparatus with the gravity valve open;

FIG. 6 is a vertical section view similar to FIG. 5 but showing the vent apparatus tipped and the gravity valve closed;

FIG. 7 is a horizontal section view taken along line 7—7 of FIG. 6;

FIG. 8 is an enlarged partial vertical section view of a third embodiment of the vent apparatus of the invention; and FIG. 9 is a horizontal section view taken along line 9—9 of FIG. 8.

DESCRIPTION OF PREFERRED EMBODIMENTS

Figure 1:
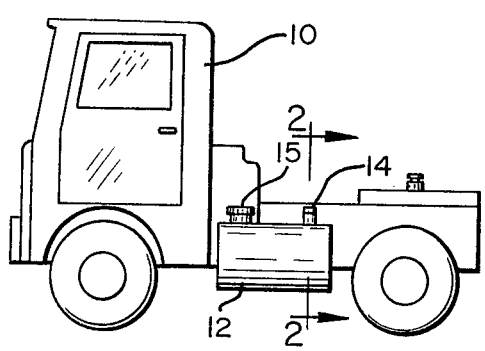
FIG. 1 is a side elevation view of a truck employing the fuel tank vent apparatus of the present invention.

As shown in FIG. 1, a truck 10 or other wheeled vehicle such as an automobile, lawn mower, etc. having a fuel tank 12 filled with liquid fuel such as gasoline, fuel oil, etc. is provided with the fuel tank vent apparatus 14 of the present invention. In addition, the fuel tank is also provided with a separate fuel filler apparatus including a fuel cap 15 which may be provided with a pressure relief valve, as shown in my earlier U.S. Pat. No.

3,918,606 of R. D. Keller, granted Nov. 11, 1975. However, the fuel vent apparatus may also serve as the fuel filler apparatus.

Figure 2:
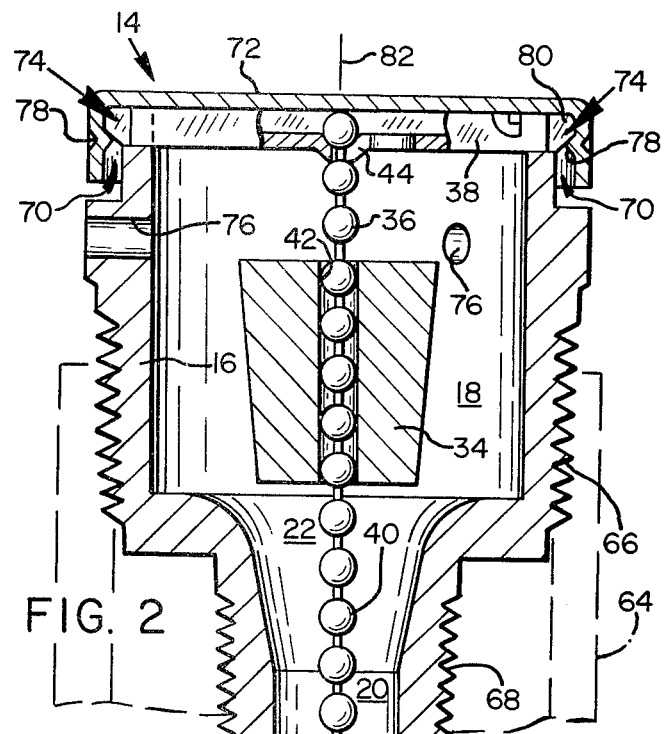
FIG. 2 is an enlarged vertical section view of one embodiment of the vent apparatus taken along line 2—2 of FIG. 1 with the gravity valve open.

The fuel tank vent apparatus 14 of one embodiment is shown in FIG. 2 and includes a vent body 16 of metal such as aluminum which defines a vent passage including a cylindrical upper passage portion 18 and a cylindrical lower passage portion 20 of smaller diameter, joined by an intermediate passage portion 22 of a tapered conical shape. The bottom of the lower passage portion 20 is also joined to a bottom passage portion 24 in the form of another circular cylinder of smaller diameter than such lower portion. The lower end of the bottom passage portion 24 terminates at the bottom surface of the vent body 16 and provides the inlet opening 26 of the vent passage.

A gravity operated valve 27 including a movable valve plate member 28 is provided at the inlet opening 26 of the vent passage. Such valve is positioned in a first fluid path provided from such vent passage to the interior of the fuel tank through four connecting passages 30. The connecting passages 30 are drilled into the bottom end of the vent body 16 and extend in communication with an annular groove 32 provided in the outer surface of such vent body surrounding the bottom portion 24 of the vent passage. Thus, the first fluid path extends from the tank through groove 32, passages 30 and inlet opening 26 to the vent passage. The gravity operated valve 27 when operated moves the valve member 28 upward into engagement with the bottom end of the vent body closing connecting passages 32 and the inlet opening 26 of the vent passage. This closes the first fluid path between the vent passage and the interior of the fuel tank. As a result, no liquid fuel can leak through such first path and such vent passage out of the fuel tank.

The valve 27 is controlled by a gravity operated control means including a weight 34 which is pivotally supported above the valve 27 by hanging it on a support chain 36 whose upper end is secured to a hanger plate 38 extending across the top of the vent body 16. The weight 34 is fastened to the chain 36 in any suitable manner such as by crimping, to position such weight within the upper vent passage portion 18. Such weight is of a frusto-conical shape and may be of any suitable heavy material such as brass, lead or other metal which is not corroded by the fuel. Similarly, the chain 36 which is formed of interconnected beads, is made of a suitable non-corrosive metal such as stainless steel. As a result, the weight 34 hangs freely on the chain and acts as a plumb weight which is maintained in a substantially vertical position. The weight 34 is connected to the movable valve member 28 by a connecting chain 40 which may be a portion of the same chain forming the support chain 36. Thus, the weight is provided with a central passage 42 through which the chain 36, 40 extends. The top end of the chain is secured into a notch 44 provided in the center of the hanger member 38 and the bottom end of such chain is secured within a tubular stem portion 46 extending upward from the center of the valve plate member 28. The stem portion 46 is secured to the bottom end of the chain 40 by crimping such stem at 48.

A second fluid path is provided from the inlet end 26 of the vent passage to the interior of the fuel tank through two openings 50 in the opposite sides of the stem 46 of the valve member 28 and through an axial passageway including portions 52 and 54 in the bottom end of a ball cage member 56 of aluminum attached to the bottom of the vent body 16. A pressure check valve 57 is formed by such ball cage and a nylon sphere 58 is provided as a check ball within the enlarged passage portion 54 of the second fluid path. The check ball is held in such passage by an inward crimped flange 60 at the bottom of such passage. This ball operates as a pressure sensitive check valve and is caused to move down into the position shown in FIG. 2 to open the check valve when there is a negative pressure within the fuel tank relative to atmospheric pressure. The ball is caused to move upward into the position shown in FIG. 3 to close the valve when there is a positive pressure within the fuel tank relative to atmospheric pressure outside the tank. The check valve has a valve seat surface 62 provided by a conical intermediate portion of the passage between the two circular cylindrical passage portions 52 and 54 which are of different diameters, the upper passage 52 being approximately one-half the diameter of the lower passage 54. An external flange 63 is provided on the lower end of the valve body 16 which snaps into a corresponding groove in the interior of the ball cage 56 to attach such cage to the valve body.

The vent body 16 is threadedly attached to a vent tube 64 of the fuel tank by external threads 66 provided on the outer surface of such vent body surrounding the upper passage portion 18. However, for tanks with a smaller vent tube a second set of threads 68 is provided on the outer surface of the vent body surrounding the lower passage 20. The upper end of the vent passageway in the vent body 16 is provided with a plurality of vent outlets 70 formed by spaces between such vent body and a vent cap 72. The upper end of the vent body 16 is provided with four slots 74 spaced 90° apart which provide the primary vent outlets 70. However, three holes 76 are drilled through the sides of the vent body 16 at equally spaced positions above the top of the vent tube 64 to provide secondary vent outlets. The hanger member 38 is positioned within two diagonal slots 74 to center it and prevent turning. The vent cap 72 is provided with four inward crimped locking projections 78 which extend into the slots 74 and slide beneath outwardly projecting flanges 80 at the top of the vent body when the cap is rotated one-quarter turn to lock the cap onto the vent body.

The longitudinal axis 82 of the vent body 16 normally extends substantially vertical, as shown in FIG. 2. In this position the gravity operated valve 27 is open since the valve member 28 is spaced away from the inlet end 26 of the vent passage. When the truck tips, such as when driving into a ditch or rolling over, the axis 82 of the vent body will be displaced from the vertical line 84 by an angle greater than a predetermined angle of, for example, 28° which is sufficient to operate the gravity valve. When this happens, the weight 34 moves relative to the valve body 16 toward the side of the upper passage portion 18 sufficiently to pull the valve member 28 into engagement with the lower end of the vent body, thereby closing the vent passage and the first fluid path through connecting passages 30. This closed position is shown in FIG. 3.

Figure 3:
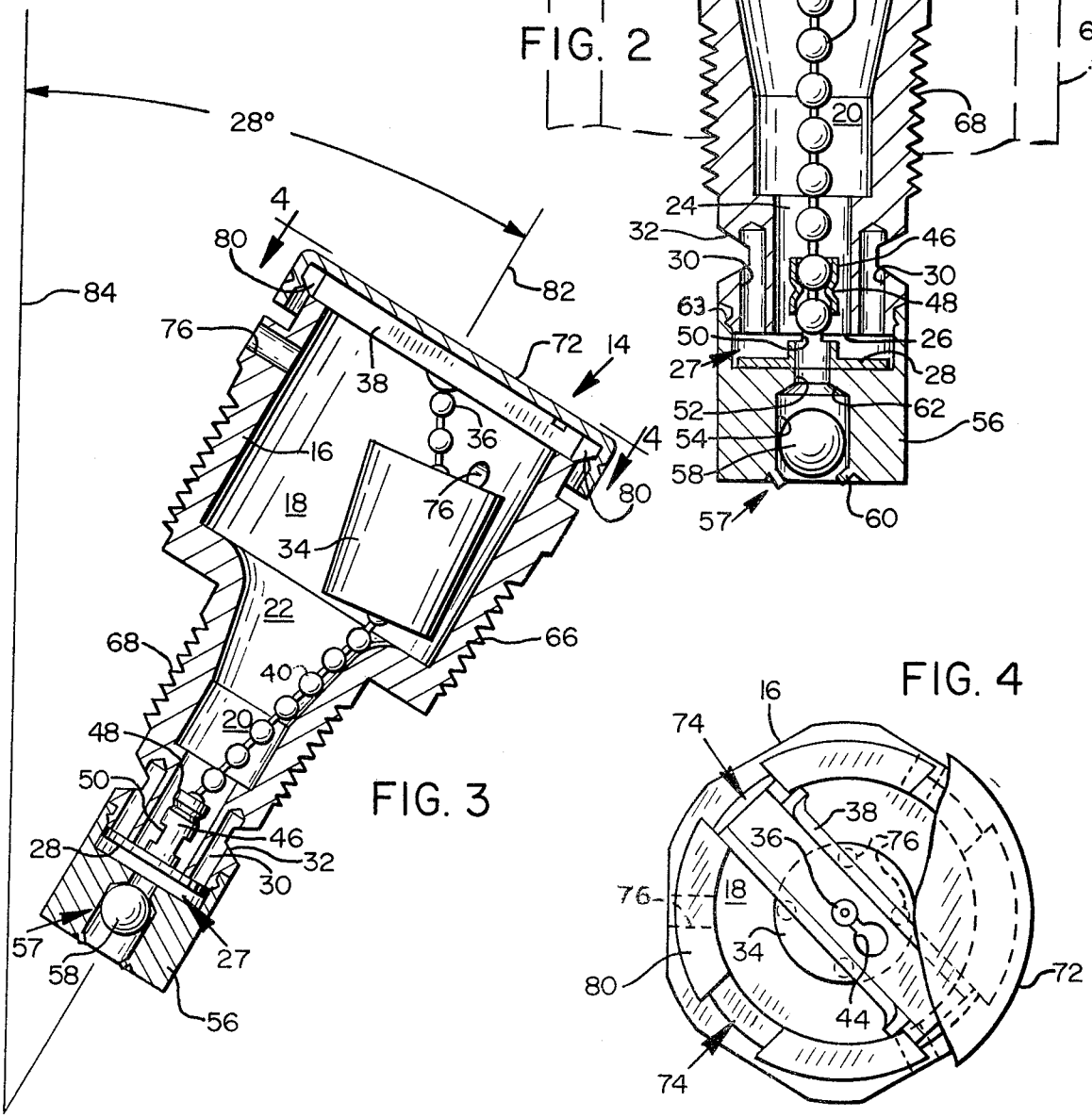
FIG. 3 is a vertical section view similar to FIG. 2 but showing the vent apparatus tipped and the gravity valve closed.

Normally there is a slight positive pressure within the fuel tank which closes the check valve 57 by causing the check ball 58 to be urged upwardly into contact with the valve seat 62, as shown in FIG. 3. Under some conditions, however, a vacuum or negative pressure may be created in the fuel tank, such as when the fuel has been pumped out of the tank to the motor. Such a vacuum would be transmitted through passages 30 and tend to hold the valve member 28 up in the closed position shown in FIG. 2. This can be quite troublesome, especially if the gravity operated valve 27 closes momentarily when a truck rounds a corner and tips sufficiently to actuate such gravity operated valve. Thus, if the vacuum in the tank holds the valve member 28 closed, than the vacuum increases until no fuel flows into the engine. This problem is averted by check valve 57 because under conditions of negative pressure, the check ball 58 is urged downwardly into the position shown in FIG. 2, thereby opening the second path to the atmosphere through the hollow stem 46 of the valve member including openings 50 and passages 52 and 54. As a result, the negative pressure is relieved and the internal pressure within the tank is equalized to the atmospheric pressure outside the tank. Once this happens the valve member 28 falls down to the open position shown in FIG. 2. Then the pressure within the tank slowly builds up to a slight positive level again, thereby closing the check valve 57.

Another embodiment of the vent apparatus of the present invention is shown in FIGS. 5, 6 and 7. This vent apparatus 14' is similar to the vent apparatus 14 of FIGS. 2 and 3 so only the differences will be described with respect to this latter embodiment and the same numbers have been used on like parts. The main difference in the second embodiment is that the support member 36' for the weight 34' is a rigid link in the form of a metal rod of brass having spherical balls 86 provided at the opposite ends thereof. The upper ball is pivotally mounted in a nylon socket member 88 attached to the vent cap 72 by a snap fit within an opening 90 provided in the center of such cap. The bottom ball of the support link 36' is pivotally mounted in a second nylon socket member 92 which is fixedly attached on internal flange 93 within opening 42 extending through the weight 34'. As a result, such weight is hung from the cap 72 above the gravity actuated valve 27' and is free to pivot about balls 86 to raise valve member 28' and close such valve.

The socket member 92 is provided with a second socket which is engaged by the upper ball 94 of the connecting link 40' which is also in the form of a solid metal rod of brass or similar non-corrosive material. The lower ball 94 of the connecting rod 40' is secured within a third nylon socket member 96 attached to the movable valve member 28'. This third socket member is held by an enlarged head 97 within the hollow stem 46' of the valve member 28'. A valve cage member 56' of aluminum or other suitable metal is fastened to the lower end of the valve body 16 by flange 63 and surrounds the movable valve member 28'. A plurality of apertures 98 are provided in the bottom of the valve cage 56' in the spaced between four leg portions 99 of such cage. The apertures 98 are in communication with the inlet end 26 of the vent passage to enable gases to be vented from the fuel tank through such vent passage to the exterior of the tank through outlets 44. The leg portions 99 are each provided with flange 100 projecting inward toward the center of the bottom of the valve cage 56'. The flanges 100 retain the valve member 28' within the cage in the event socket 96 becomes disconnected from the connecting rod 40'.

In the second embodiment of the vent apparatus, when the truck turns over or there is any other tipping of the fuel tank to cause the longitudinal axis 82 of the vent body 86 to be displaced by an angle greater than 35° with respect to the vertical line 84, the plumb weight 34 is moved sufficiently to the side of passage portion 18 to close the valve. Thus, in the closed position the weight pulls the link 40' and moves the valve member 28' up into contact with the lower edge of inlet 26 of the vent passage. It should be noted that in this embodiment the intermediate passage portion 22' of the vent passage is provided with a greater length and conical taper in order to accommodate the rigid connecting link 40'.

The check valve 57 including ball 58 of FIG. 2 has been eliminated from the embodiment of FIG. 5. However, in this embodiment when a vacuum is produced within the fuel tank, such vacuum tends to move the valve member 28 down into the open position of FIG. 5 and does not tend to hold such valve member in the closed position of FIG. 6 as it does in the earlier embodiment. Thus, the same problem does not exist in the embodiment of FIG. 5. However, when positive pressure is produced within the fuel tank, it does tend to hold the valve closed so this is a problem. This can be overcome by providing a pressure relief valve in the filler cap. For low pressures, the weight of the weight 34' would be sufficient to reopen the valve 27'. At greater positive pressures the pressure relief valve opens to reduce such pressure and enable the valve 27' to reopen.

Figure 4:
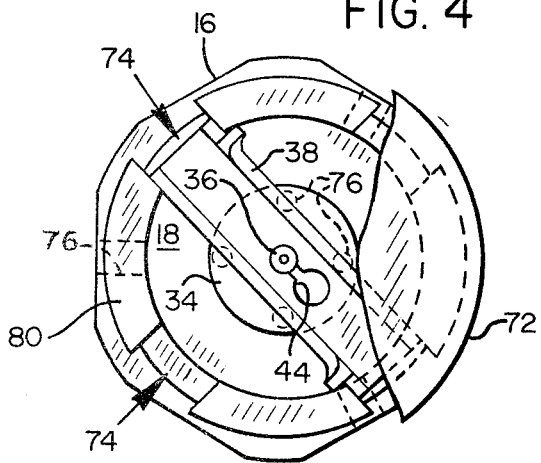
FIG. 4 is a plan view of the top of FIG. 3 taken along line 4—4 of FIG. 3 with a portion of the cap removed for clarity.

A third embodiment of the vent apparatus of the present invention is shown in FIGS. 8 and 9. This third embodiment is similar to that of FIGS. 2 and 4, so that only the differences will be described and the same numbers will be used for like parts. The movable valve member 28" employs a conical end portion 102 rather than the flat valve plate. When the gravity operated valve 27" is tipped into the closed position so that axis 82 is displaced about 30° from the vertical, the conical end 102 is raised by chain 40 and urges three spherical valve closure members or balls 104 upward into engagement with valve seats 106 in the three connecting passages 30', closing the first path. Passages 30' slant at an angle of about 45° to 55° with respect to the vent passage axis 82. However, the pressure check valve 57 may be opened by negative gas pressure within the fuel tank urging check ball 58 downward to provide a second path to the vent passageway 24 through the hollow stem 76 and holes 50. This enables valve members 28" and 106 to fall downward to reopen the gravity valve 27" when the fuel vent axis 82 returns to a vertical position. Thus check valve 57 prevents such gravity valve from sticking closed by operating in a similar manner to the embodiment of FIG. 2.

It will be obvious to those having ordinary skill in the art that many changes may be made in the above-described preferred embodiments of the present invention without departing from the spirit of the invention. For example, other types of hanger support means can be employed instead of bead chains or ball and socket links, such as, e.g., a nylon cord. Also, the cord could be provided as two pieces, one of which is attached between the top of the weight 34 and the hanger 38 and another of which attached between the bottom of such weight and the valve member 28. Therefore, the scope of the present invention should only be determined by the following claims.

I claim:

1. A motor vehicle fuel tank vent apparatus comprising:
   a vent body adapted to be secured within an opening in a liquid fuel tank on a motor vehicle and having a passageway with longitudinal axis extending through said vent body from a vent inlet to a vent outlet;

valve means including a movable valve member for controlling the flow of fluid through said passageway;

gravity operated control means for opening and closing said valve means in accordance with the position of the axis of said passageway so that said valve means is open when the vent body is upright and said axis is positioned substantially vertical, is closed when said axis is moved to an angle greater than a predetermined angle with respect to said vertical position to prevent leakage and reopens when said axis returns to said vertical position;

said control means including a gravity operated weight member pivotally supported by a support means in a position above the valve means;

connector means for connecting said weight member to said valve member with a pivot connection between said connector means and said valve member for opening and closing said valve means by movement of said weight; and said support means and connector means comprising a pair of link rods including an upper link rod and a lower link rod which are pivotally connected at one end to the weight by ball and socket connections, with the lower rod being pivotally connected at its other end to the valve member by a ball and socket connection.

2. A vent apparatus in accordance with claim 1 in which the support means is pivotally attached to the weight and supports the weight so that it hangs as a plumb weight.

3. A vent apparatus in accordance with claim 1 in which the valve member is held as a captive member within a valve cage having a plurality of openings in the side of said cage so that it moves upward into engagement with a valve seat at the inlet of said passageway to close the valve.

4. A vent apparatus in accordance with claim 3 in which the valve cage is formed by a cage member attached to the lower end of said vent body.

5. A vent apparatus in accordance with claim 3 in which the valve member closes a first fluid path from the inlet of said passageway through said cage to vent openings in the side of said vent body.

6. A vent apparatus in accordance with claim 1 with fastening means for attaching said vent body to a fuel tank.

7. A vent apparatus in accordance with claim 1 in which the vent body is attached to the fuel tank of a truck.

8. A vent apparatus in accordance with claim 1 in which the passageway includes a conical portion containing the lower link with the large end of the cone adjacent the weight.

9. A vent apparatus in accordance with claim 1 in which the upper link is pivotally connected at its other end to a vent cap covering the outlet of the vent body except for vent holes spaced around the edge of said outlet.

10. A vent apparatus in accordance with claim 9 in which the lower link is longer than the upper link.

11. A vent apparatus in accordance with claim 1 in which the pivot connections include ball and socket members, and the socket members are made of synthetic plastic material.

* * * * *